(12) United States Patent
Clawges

(10) Patent No.: US 7,974,887 B2
(45) Date of Patent: Jul. 5, 2011

(54) POOL SUPPLY AND SERVICE SYSTEM

(76) Inventor: Eric Clawges, Clermont, FL (US)

( * ) Notice: Subject to any disclaimer, the term of this patent is extended or adjusted under 35 U.S.C. 154(b) by 993 days.

(21) Appl. No.: 11/757,429

(22) Filed: Jun. 4, 2007

(65) Prior Publication Data
US 2008/0301004 A1 Dec. 4, 2008

(51) Int. Cl.
*G06Q 30/00* (2006.01)
(52) U.S. Cl. .................................... 705/26.5; 705/26.1
(58) Field of Classification Search ............... 705/26, 705/26.1, 26.5, 27, 27.1
See application file for complete search history.

(56) References Cited

U.S. PATENT DOCUMENTS

| | | | |
|---|---|---|---|
| 6,950,826 B1 * | 9/2005 | Freeman | 1/1 |
| 7,376,603 B1 * | 5/2008 | Mayr et al. | 705/35 |
| 7,797,179 B2 * | 9/2010 | Chakraborty et al. | 705/7 |
| 2002/0062226 A1 * | 5/2002 | Ito et al. | 705/2 |
| 2003/0163353 A1 * | 8/2003 | Luce et al. | 705/2 |

OTHER PUBLICATIONS

Author unknown, "First Digital Test Strip Reader Makes Testing Easier, Faster for Pool and Spa Owners Accurate Results Available in Seconds; Displayed on Large Easy-to-Read LCD Screen," PR Newswire, Apr. 18, 2007.*
Author unknown, "Pure H2O Technologies Offers Next Generation Water Treamtnet Technology Through New Web Site," Business Wire, New York, May 24, 2007.*

* cited by examiner

*Primary Examiner* — Amee A Shah
(74) *Attorney, Agent, or Firm* — Daniel Law Offices, P.A.; Jason T. Daniel, Esq.

(57) ABSTRACT

Systems and methods for the efficient and convenient provision of pool services, equipment and supplies. The system incorporates a network between a pool distributor, pool regional dealer and pool customer. The system allows for the distributor to increase market share by providing benefits to pool customers who sign up to the network, i.e., provide profile information. In exchange for passing the business to regional dealers, regional dealers agree to promote and employ distributor's products.

5 Claims, 7 Drawing Sheets

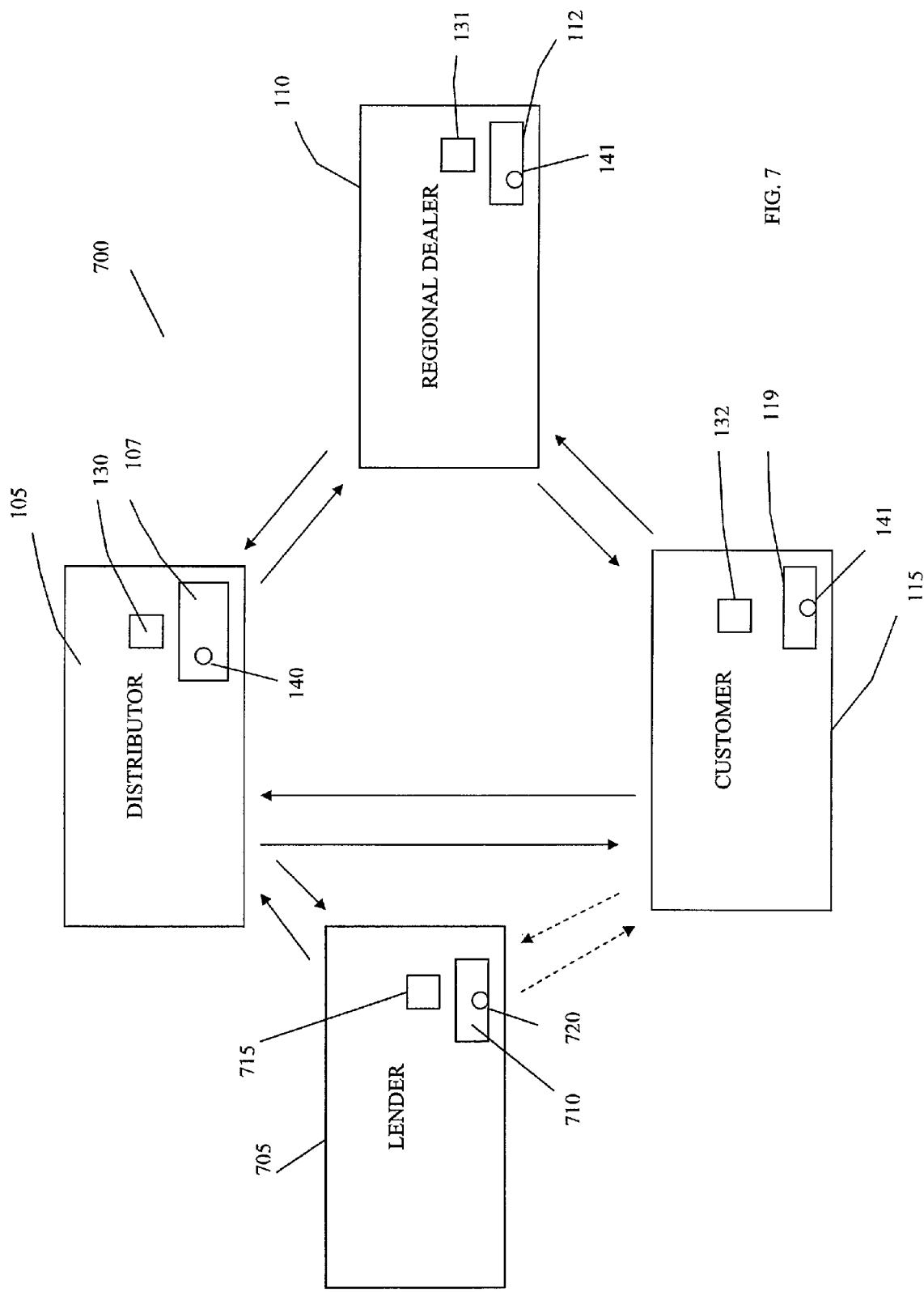

POOL SUPPLY AND SERVICE SYSTEM

BACKGROUND

Pool manufacturing is a growing industry. The number of pools being built every year is constantly on the rise (www.poolspanews.com/2004/061/061qmr_market.html). As a natural result of this growth, the market for pool chemicals, other supplies and pool service, an already healthy industry, is growing as well. Developing new ways of servicing the growing demand for supplies and chemicals will be beneficial for businesses to compete in this growing market. In this day and age of internet marketing, websites have been developed in an attempt to market goods that may be shipped via existing courier services. However, but for the convenience of ordering products online, little value is added to the customers and pool industry companies of the supply chain. Accordingly, there remains a void in the pool supply and servicing industry for a workable system that integrates the pool supply manufacturers, distributors, and local dealerships to provide value to each of these components, and ultimately, to the customers.

BRIEF DESCRIPTION OF THE DRAWINGS

FIG. 7 shows a diagram of a system embodiment.

DETAILED DESCRIPTION

Certain embodiments of the subject invention relate to a pool service system that allows for the expedient inputting of pool water information by a pool customer, analysis of this pool water information, generation of a pool water treatment prescription and delivery of pool water treatment agents to the pool user.

Figure 1:
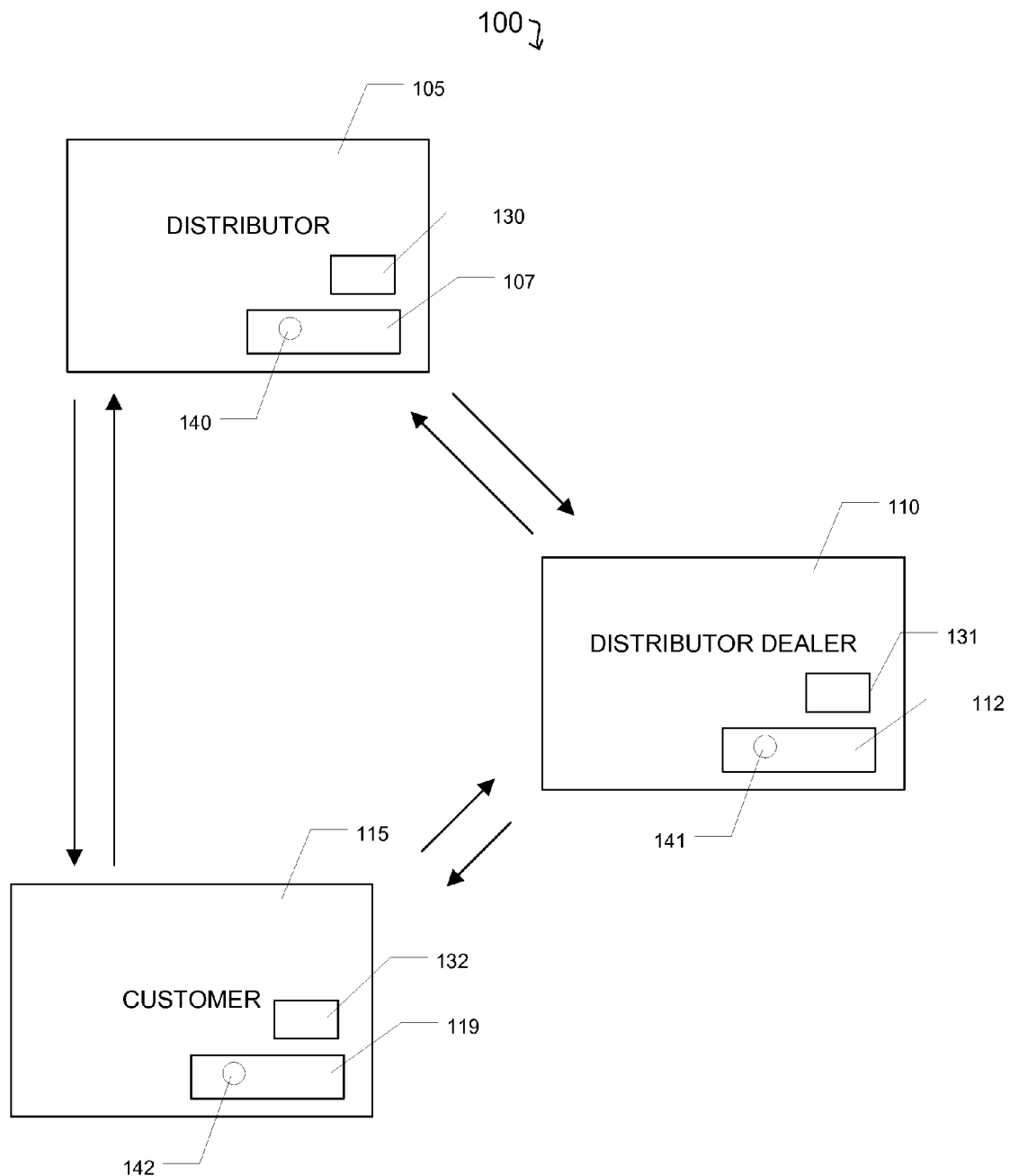
FIG. 1 shows a diagram of a system embodiment.

In another embodiment, as shown in FIG. 1, the subject invention relates to a system 100 of providing a more efficient supply conduit from a pool supply distributor 105 to a regional pool customer 115. The system 100 involves the networking of a distributor 105 and regional dealer 110. The distributor 105 maintains a distributor computer unit 107. Pool customers 115 maintain a computer unit 119, which is communicatingly connected to the central unit 107. The distributor computer unit 107 is also communicatingly connected to a regional dealer's computer unit 112. The distributor computer unit 107, the regional dealer computer unit 112, and the pool customer computer unit 119 each have displays in association therewith 130, 131 and 132, respectively, for displaying information. Each computer unit comprises at least one processing module 140, 141, and 142, respectively, for processing information.

The network of the distributor, regional dealer and pool customer is established by the distributor. The network provides advantages to the regional dealer. The regional dealer will benefit by the marketing efforts of the distributor, since pool users who contact the distributor either through use of a computer program product on the pool customer computer unit, or through contact with the distributor's website, or some combination of program code modules on the pool customer computer unit and/or the distributor computer unit, pool customers identified to be within the regional dealer's region will be routed to the regional dealer. Thus, the regional dealer will realize increased business by belonging to the network. The distributor will benefit by increasing the regional dealer's business which in turn increases distributor's business, since the regional dealer agrees to favored use distributor's product. Thus, the network increases the market share of the distributor. The pool customer benefits by saving time and money related to obtaining water treatment agents, equipment, pool service, etc. The network provides an easy and convenient system for obtaining pool services, supplies, and/or equipment.

As will be appreciated by one of skill in the art, embodiments of the present invention may be embodied as a device or system comprising a processing module, and/or computer program product comprising at least one program code module. Accordingly, the present invention may take the form of an entirely hardware embodiment or an embodiment combining software and hardware aspects. Furthermore, the present invention may include a computer program product on a computer-usable storage medium having computer-usable program code means embodied in the medium. Any suitable computer readable medium may be utilized including hard disks, CD-ROMs, DVDs, optical storage devices, or magnetic storage devices.

The term "processing module" may include a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The processing module may have operationally coupled thereto, or integrated therewith, a memory device. The memory device may be a single memory device or a plurality of memory devices. Such a memory device may be a read-only memory, random access memory, volatile memory, non-volatile memory, static memory, dynamic memory, flash memory, and/or any device that stores digital information. A computer, as used herein, is a device that comprises at least one processing module.

The computer-usable or computer-readable medium may be or include, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM), a CD ROM, a DVD (digital video disk), or other electronic storage medium. Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of certain embodiments of the present invention may be written in an object oriented and/or conventional procedural programming languages including, but not limited to, Java, Smalltalk, Perl, Python, Ruby, Lisp, PHP, "C", FORTRAN, or C++. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Certain embodiments of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program code modules. These program code modules may be provided to a processing module of a general purpose computer, special purpose computer, embedded processor or other programmable data processing apparatus to produce a machine, such that the program code modules, which execute via the processing module of the computer or other programmable data processing apparatus, create means for implementing the functions specified in the flowchart and/or block diagram block or blocks.

These computer program code modules may also be stored in a computer-readable memory that can direct a computer or other programmable data processing apparatus to function in a particular manner, such that the program code modules stored in the computer-readable memory produce an article of manufacture.

The computer program code modules may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

Figure 2:
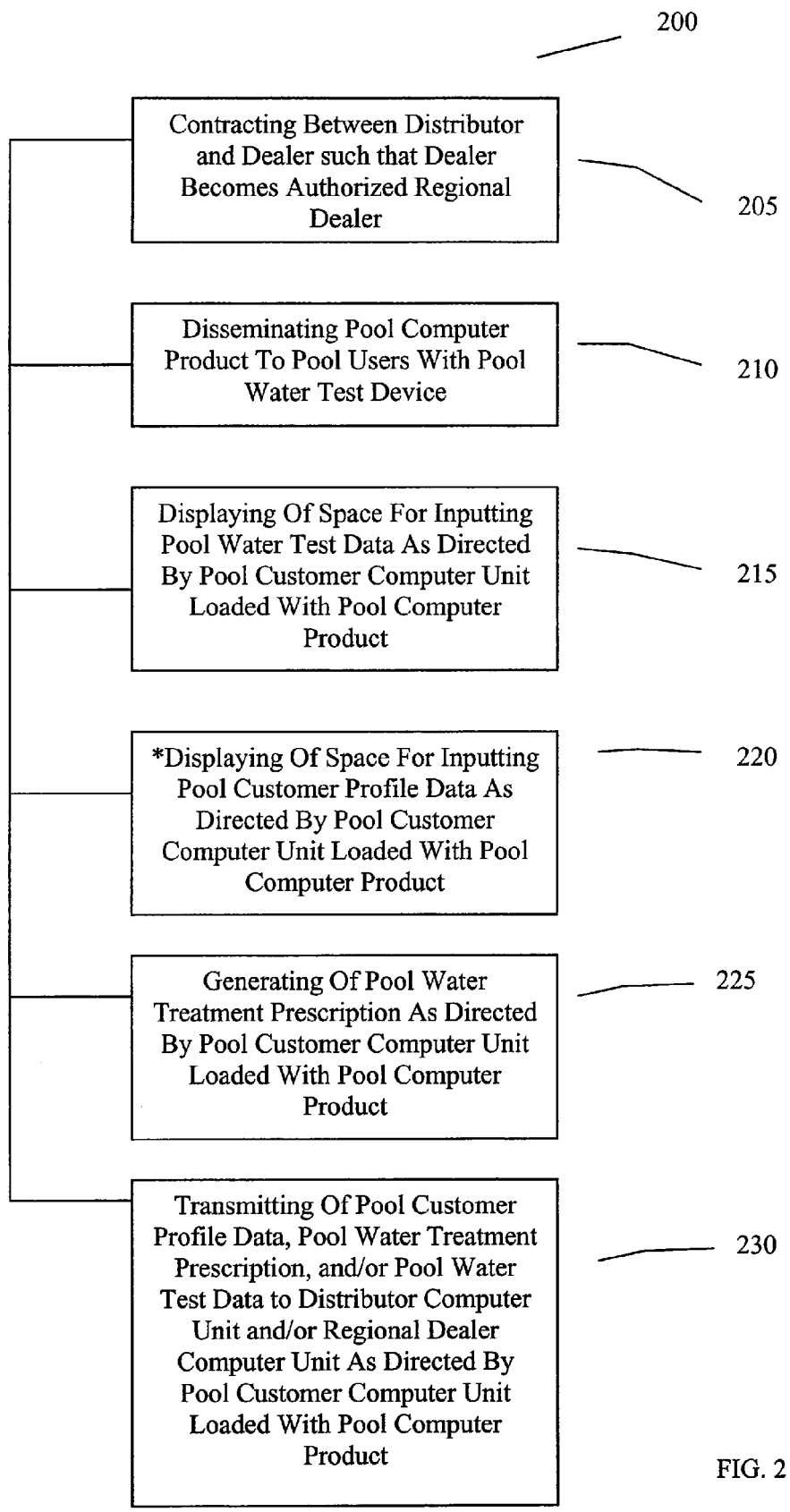
FIG. 2 shows a diagram of a method embodiment.

FIG. 2 shows a diagram 200 of an embodiment of the invention. As described above, operational steps may be executed by computer program code modules. The program code modules may execute entirely on a pool customer's (a user computer) computer unit, partly on pool customer's computer unit, or entirely on a distributor and/or a regional dealer's computer unit (a remote computer unit). Furthermore, it is noted that 'a computer unit' may comprise one or more computer units. For embodiment 200, it is contemplated that the program code modules execute operational steps 215-230 entirely on the pool customer's computer unit or partly on the pool customer's computer unit. The embodiment 200 comprises the step 205 of the distributor contracting with a dealer such that the dealer becomes a regional dealer. In exchange for the opportunity to belong to the distributor's network, and the marketing benefits provided therewith, a regional dealer agrees to certain predetermined terms, e.g., service and delivery guidelines, price ranges and/or favored use of distributor's goods. The distributor produces and generates a computer program product that is packaged with pool water test device, such as test strips 210. The computer program product is designed for loading onto a pool customer computer unit and comprises several program code modules for executing various operational steps. Displayed on the pool customer's display is a space for inputting pool water test data 215. The pool customer inputs such data and optionally is informed that other information, profile data, needs to be inputted in order to receive a pool water treatment prescription 220. The pool customer's profile includes information such as address information, size of the pool customer's pool, pool customer's pool equipment, and pool customer credit card. Upon inputting of such information, a pool water treatment prescription is generated for the pool customer 225. Pool customer profile data, the pool water treatment prescription and/or the pool water test data is transmitted to a remote computer, either a distributor computer unit or regional dealer computer unit 230. The provision of the computer program product with test strips encourages the pool user to utilize the test strips and to analyze the pool water test data using the computer program product. In turn, important information is selectively sent remotely to the distributor and/or dealer such that a valuable customer contact is established.

Figure 3:
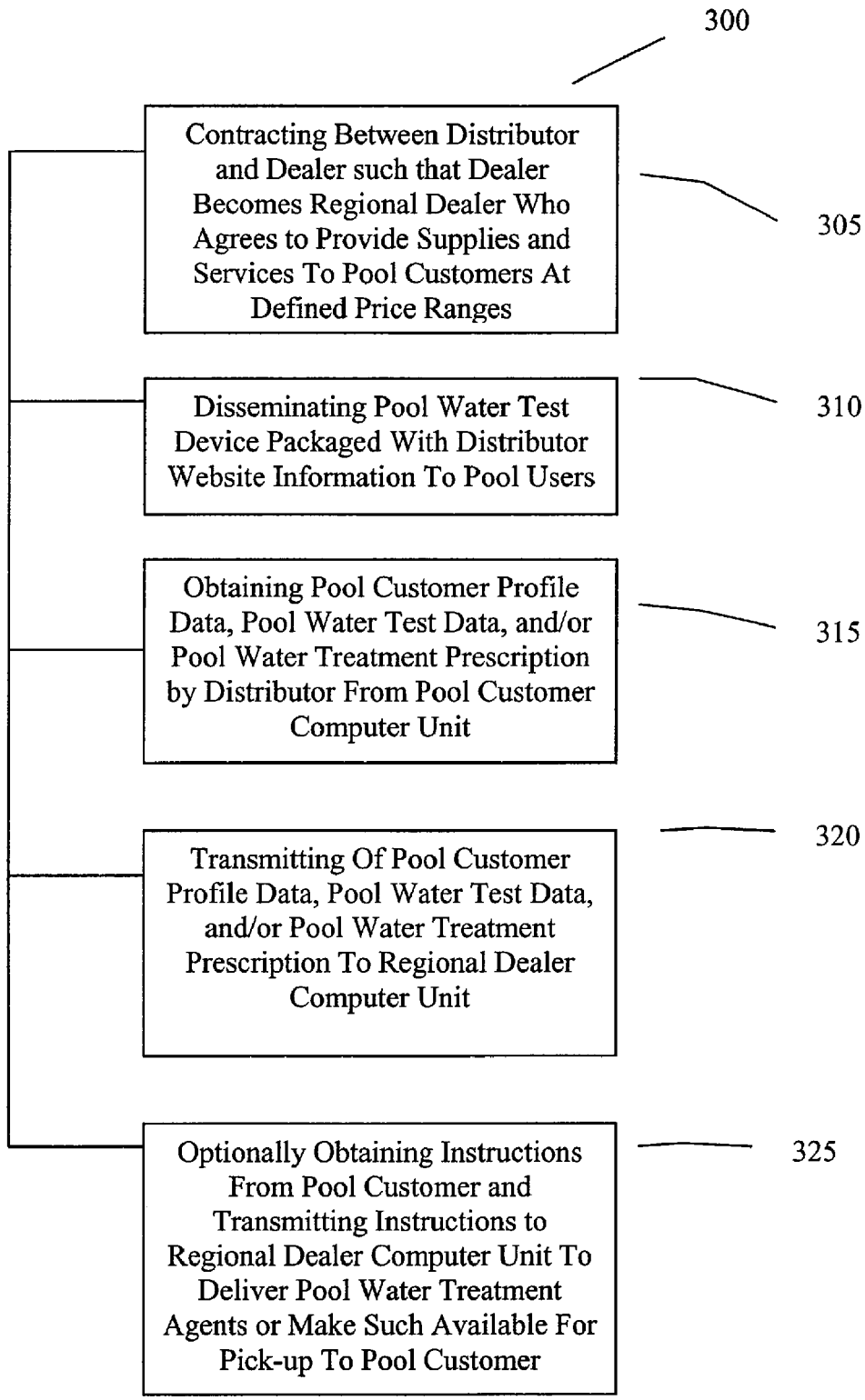
FIG. 3 shows a diagram of a method embodiment.

FIG. 3 shows a diagram of an embodiment 300 of the invention. For embodiment 300, program code modules execute operational steps 315-325 entirely on a distributor computer unit, or partly on a distributor computer unit. According to embodiment 300, the distributor contracts with a dealer such the dealer becomes a regional dealer 305. In exchange for the opportunity to belong to the distributor's network, and the marketing benefits provided therewith, a regional dealer agrees to certain predetermined terms, e.g., service and delivery guidelines, price ranges and/or favored use of distributor's goods.

The distributor disseminates an article of manufacture comprising a pool water test device, such as pool water test strips packaged together with materials containing website address information of the distributor 310. The distributor obtains pool customer profile data and/or pool water test data from pool customer computer unit 315. The distributor transmits pool customer profile data, pool water test data, and/or a pool water treatment prescription to regional dealer 320. Optionally, the distributor obtains instructions from pool customer regarding whether pool customer wishes for pool treatment agents be delivered to pool customer, (or made available for pickup) and transmits those instructions to regional dealer 325.

Figure 4:
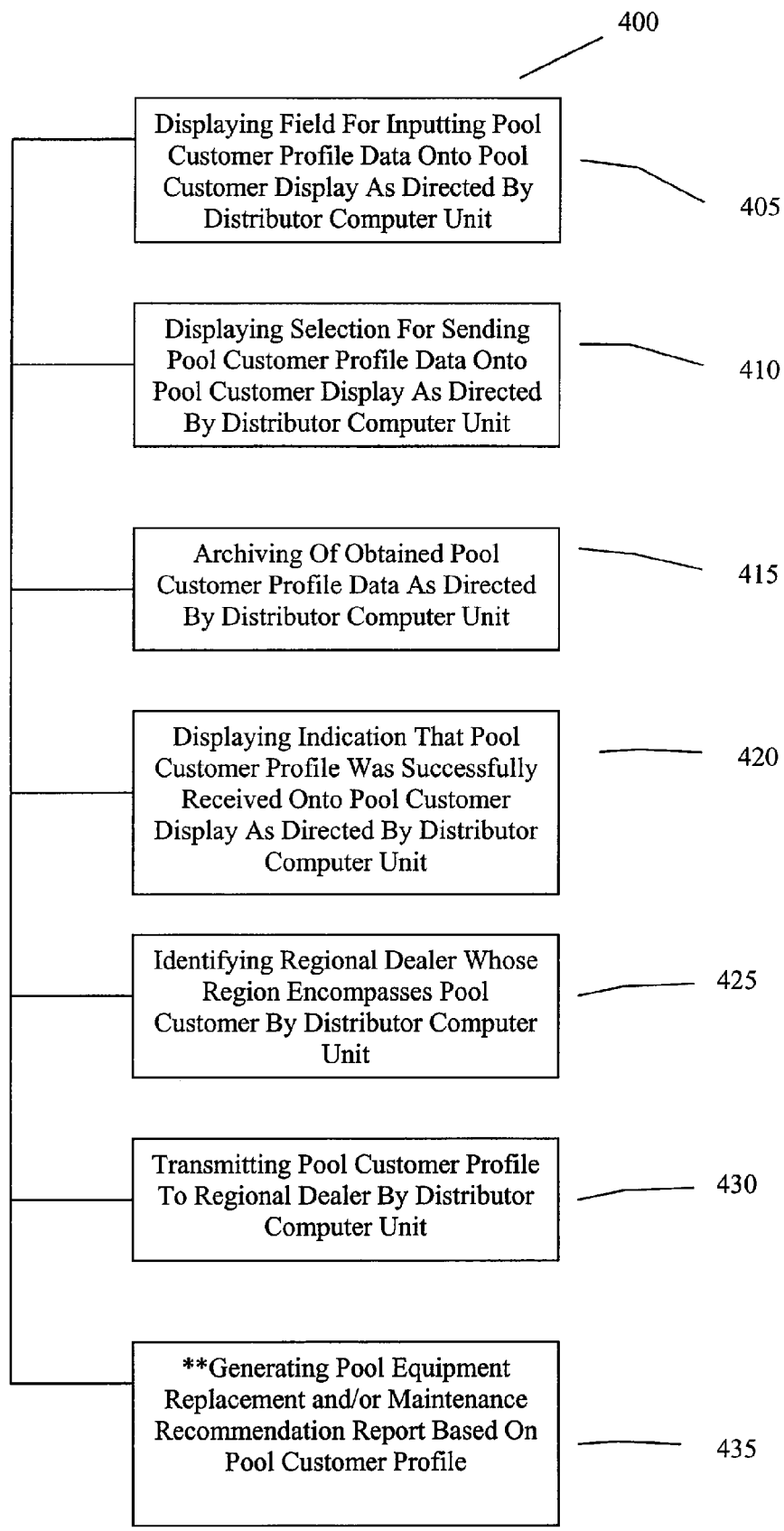
FIG. 4 shows a diagram of a method embodiment.

FIG. 4 shows a diagram of an embodiment 400 of the invention. For embodiment 400, program code modules execute operational steps 405-435 entirely on a distributor computer unit, or partly on a distributor computer unit. According to embodiment 400, the distributor directs there to be displayed onto pool customer's display a field for inputting pool customer profile data 405. The distributor directs there to be displayed onto pool customer's display a selection for sending pool customer profile data to distributor 410. The selection may take multiple forms but typically is a clickable button that can be clicked using any number of devices associated with pool customer's computer unit such as a mouse, keyboard, pointer etc. The distributor archives the information obtained from the pool customer 415. The distributor provides indication to pool customer that pool customer information was successfully received 420. Based on pool customer information, distributor identifies a regional dealer whose region encompasses the pool customer's pool 425. The distributor transmits pool customer profile data to regional dealer 430. A pool equipment replacement and/or maintenance recommendation report is generated 435. This may be generated by the regional dealer or the distributor. Typically, this report is generated by matching pool customer equipment information with equipment information archived in a database on a computer unit of distributor.

The report may include, but is not limited to, line art depicting the pool customer's equipment and the suggestion of replacement parts. The report may also include a recommended schedule for filter cleaning, for diagnostic checks on all equipment, vacuuming, brushing and safety inspections. Reminders may be sent from the distributor or the regional dealer reminding the pool customer to carry out these events. The report may also include fields to initiate a maintenance agreement transaction between the pool customer and regional dealer to provide one or more of the above stated services. The maintenance agreement will provide customers flat rate pricing up front for their pool and spa needs (note, unless specifically stated, pool is intended to include spas). The pool customer may also be provided with discounted rates for becoming a multi-level user (i.e., a pool customer that uses more than one product and/or service provided by the regional dealer).

Figure 5:
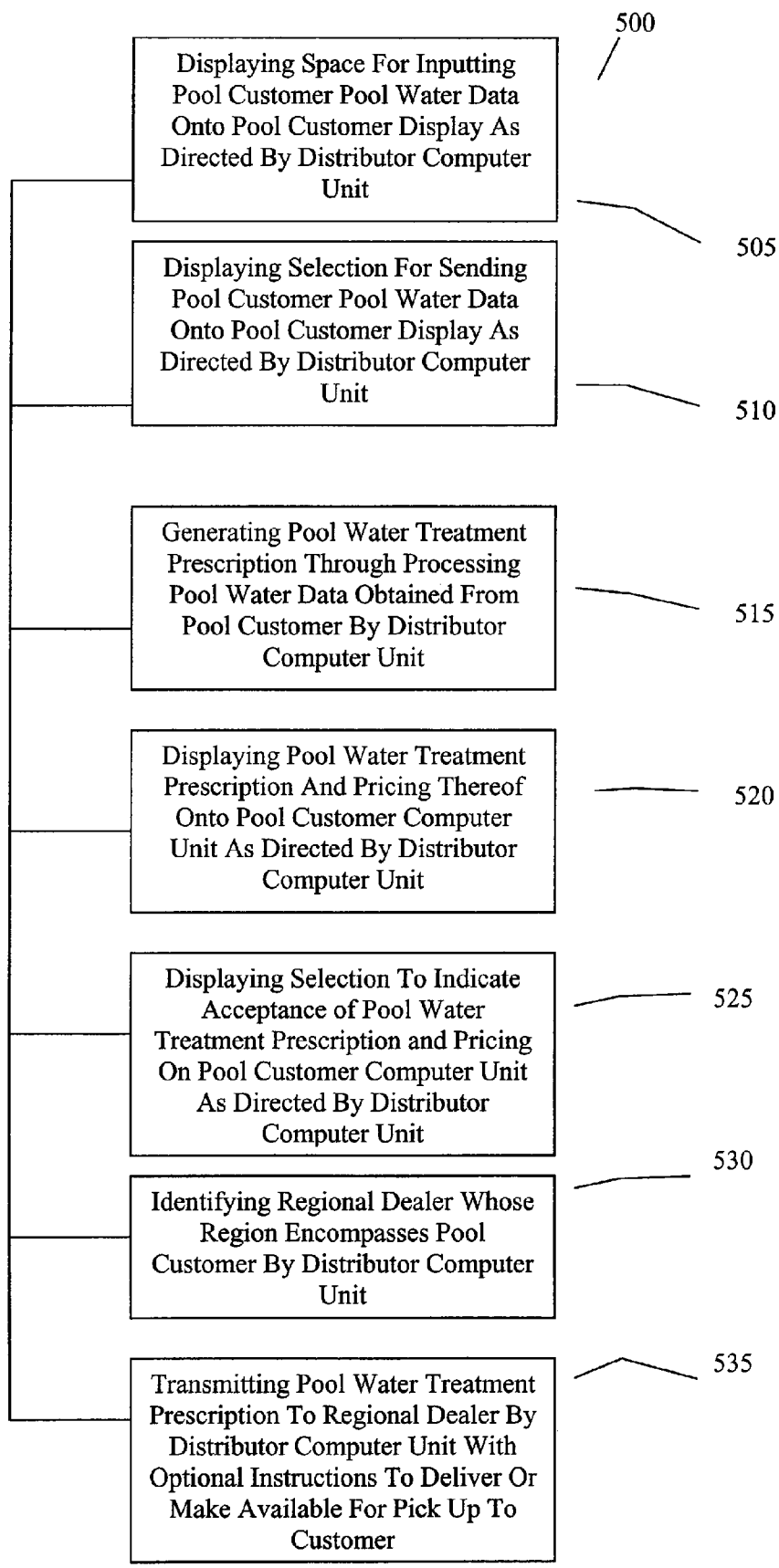
FIG. 5 shows a diagram of a method embodiment.

FIG. 5 shows a diagram of an embodiment 500 of the invention. For embodiment 500, program code modules execute operational steps 505-435 entirely on a distributor computer unit, or partly on a distributor computer unit. For embodiment 500, the distributor directs there to be displayed on a pool customer's display a field for inputting pool water data 505. This is typically data obtained by conventional water testing devices, including but not limited to, water test strips or water test kits. The distributor directs there to be displayed on a pool customer's display a selection for sending pool customer pool water data to distributor 510. The distributor generates a pool water treatment prescription based on data obtained from pool customer 515. The distributor directs that the pool water treatment prescription and pricing for same to be displayed on pool customer's display 520 and that a selection to indicate acceptance of pool water treatment prescription and pricing be displayed 525. The distributor identifies a regional dealer whose region encompasses the pool customer 530. The distributor transmits the pool water treatment prescription to the regional dealer optionally with instructions to deliver or make available for pickup to pool water customer 535.

Figure 6:
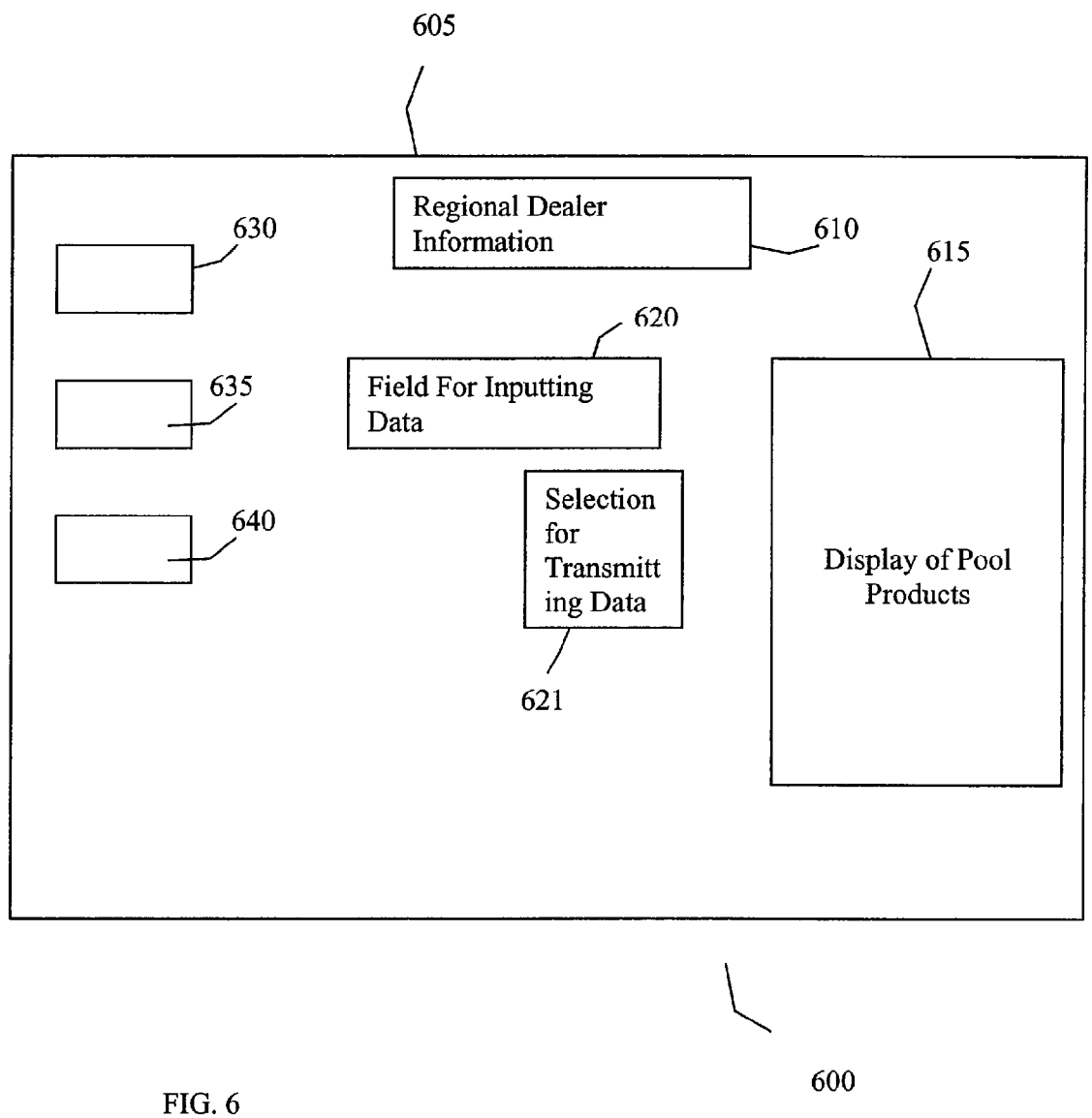
FIG. 6 shows a screen embodiment of a pool customer display.

FIG. 6 shows a diagram of an embodiment 600. As part of the benefit to regional dealers, one or more of a group of fields and/or information is caused to be displayed on pool customer's display upon the pool customer inputting and transmitting pool water test data and/or pool customer profile data. A page 605 is caused to be displayed on pool customer's display which provides identifying information of the regional dealer 610, as well as pool related products and services offered by the regional dealer 615. Optionally, shown on same page or pages hyperlinked to page 605 is a field 620 for inputting pool water test data and pool customer profile data is shown. A clickable selection 621 for transmitting data to a remote computer is shown. Optionally shown on page 600 or pages hyperlinked thereto are clickable selections for selecting pool equipment or replacement parts 630, for selecting regular pool servicing 635, or for selecting pool remodeling or new construction 640 are displayed, or some combination thereof. The selection of one or more of the foregoing selections initiates a transaction directly to with the regional dealer or indirectly with the regional dealer via the distributor.

FIG. 7 shows a diagram of an alternate system embodiment 700. The system incorporates the components of the system 100 shown in FIG. 1 with the added party of a lender 705, lender computer unit 710 (comprising a processing module 720) and lender display 715. As part of the agreement between distributor and regional dealer, the regional dealer may agrees a pricing formula per unit for construction or remodeling of pools based on objective criteria (such as current market pricing for materials). The distributor directs there to be displayed on pool customer's display fields for inputting size and dimensions of pool and displaying selections for tiles and colors, pool surface types and colors and deck types and colors. The distributor directs there to be displayed on the pool customer's display a field for inputting financial related information of the customer. This information is transmitted to a lender who in turn provides distributor with indication of approval or denial of financing. Alternatively, information is transmitted directly to the lender from the pool customer. Depending on the outcome, the distributor directs there to be displayed on pool customer's display an approval or denial indication for financing. Upon approval for lending and confirmation of pool specifications, the pool specifications and money are sent to the regional dealer to begin the work.

The disclosures of the cited patent documents, publications and/or references are incorporated herein in their entirety to the extent not inconsistent with the teachings herein.

While a number of embodiments of the present invention have been shown and described herein in the present context, such embodiments are provided by way of example only, and not of limitation. Numerous variations, changes and substitutions will occur to those of skilled in the art without departing from the invention herein. For example, the present invention need not be limited to best mode disclosed herein, since other applications can equally benefit from the teachings of the present invention.

Accordingly, it is intended that the invention be limited only by the spirit and scope of the appended claims in accordance with relevant law as to their interpretation.

The invention claimed is:

1. A pool service and supply system comprising
a pool distributor computer unit;
a regional dealer computer unit;
a pool customer computer unit and a display associated therewith, wherein said pool distributor computer unit, said regional dealer computer unit and said pool customer computer unit are communicatingly connected;
a first program code module for causing a field to be displayed on said display for inputting of pool customer pool water data by a pool customer;
a second program code module for causing a selection for sending pool customer pool water data to be displayed on said display;
a third program code module for causing a pool water treatment prescription and pricing of same to be generated based on inputted pool customer pool water data to be generated;
a fourth program code module for causing said pool water treatment prescription and pricing to be displayed on said display;
a fifth program code module for causing a selection for indicating acceptance of said pool water treatment prescription and pricing;
a sixth program code module for causing a regional dealer whose region encompasses said pool customer to be identified; and
a seventh program code module for causing said pool water treatment prescription or pool water test data to be transmitted to said regional dealer computer unit;
wherein said first through seventh program code modules are executed entirely or partly on said pool customer computer unit or entirely or partly on said pool distributor computer unit.

2. The pool service and supply system of claim 1, wherein said first through seventh program code modules are executed partly on said pool customer computer unit and partly on said pool distributor computer unit.

3. A computer program product stored on a medium for use with a pool customer computer unit communicatingly connected to a pool distributor computer unit or a regional dealer computer unit, said pool customer computer unit comprising a display associated therewith, and said product comprising a first program code module for causing a field to be displayed on said display for inputting of pool customer pool water data by a pool customer;

a second program code module for causing a selection for sending pool customer pool water data to be displayed on said display;

a third program code module for causing a pool water treatment prescription and pricing of same to be generated based on inputted pool customer pool water data to be generated;

a fourth program code module for causing said pool water treatment prescription and pricing to be displayed on said display;

a fifth program code module for causing a selection for indicating acceptance of said pool water treatment prescription and pricing;

a sixth program code module for causing a regional dealer whose region encompasses said pool customer to be identified; and a seventh program code module for causing said pool water treatment prescription or pool water test data to be transmitted to said regional dealer computer unit;

wherein said first through seventh program code modules are executed entirely or partly on said pool customer computer unit.

4. An article of manufacture comprising the computer program product of claim 3 packaged together with a pool water test device.

5. The article of manufacture of claim 4, wherein said pool water test device is a pool water test strip.

* * * * *